United States Patent
Liu et al.

(10) Patent No.: US 9,986,452 B2
(45) Date of Patent: May 29, 2018

(54) METHODS OF ADAPTING MEASUREMENT RATE ACCOUNTING FOR CARRIER FREQUENCY

(71) Applicant: Telefonaktiebolaget L M Ericsson (publ), Stockholm (SE)

(72) Inventors: Jinhua Liu, Beijing (CN); Muhammad Kazmi, Bromma (SE); Gen Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 177 days.

(21) Appl. No.: 14/442,824

(22) PCT Filed: Jun. 13, 2014

(86) PCT No.: PCT/SE2014/050722
§ 371 (c)(1),
(2) Date: May 14, 2015

(87) PCT Pub. No.: WO2015/190967
PCT Pub. Date: Dec. 17, 2015

(65) Prior Publication Data
US 2016/0286419 A1    Sep. 29, 2016

(51) Int. Cl.
*H04W 24/08* (2009.01)
*H04W 24/10* (2009.01)
(Continued)

(52) U.S. Cl.
CPC ............ *H04W 24/08* (2013.01); *H04L 43/16* (2013.01); *H04W 24/10* (2013.01);
(Continued)

(58) Field of Classification Search
CPC ..... H04W 48/12; H04W 48/16; H04W 48/18; H04W 48/20; H04W 88/06; H04W 36/30;
(Continued)

(56) References Cited

U.S. PATENT DOCUMENTS 6,292,660 B1 * 9/2001 Hartless ............... H04W 48/16
455/434
6,331,971 B1 * 12/2001 Raith ............... H04W 52/0216
370/311
(Continued)

FOREIGN PATENT DOCUMENTS

GB        2358550 A      7/2001
WO    2008050230 A2     5/2008
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); User Equipment (UE) radio transmission and reception (Release 12)", Technical Specification, 3GPP TS 36.101 V12.0.0, Jul. 1, 2013, pp. 1-450, 3GPP, France.

*Primary Examiner* — Wutchung Chu
(74) *Attorney, Agent, or Firm* — Coats & Bennett, PLLC (57) ABSTRACT

The disclosure pertains to the field of performing measurements on radio signals in a communication system. More particularly the disclosure relates to methods of adapting measurement rate accounting for operating frequency. A method performed in a measuring node comprises obtaining S3 a carrier frequency of at least one radio signal to measure, determining S4 a measurement rate based on the obtained carrier frequency, and performing S5 at least one measurement on the radio signal with the determined measurement rate. The disclosure further relates to a corresponding method performed in a network node, a measuring node, e.g. wireless device, a network node and to corresponding computer programs.

26 Claims, 7 Drawing Sheets

(51) Int. Cl.
  *H04L 12/26* (2006.01)
  *H04W 72/04* (2009.01)
  *H04W 76/04* (2009.01)

(52) U.S. Cl.
  CPC ..... *H04W 72/042* (2013.01); *H04W 72/0446* (2013.01); *H04W 76/048* (2013.01)

(58) Field of Classification Search
  CPC ............ H04W 36/0083; H04W 24/10; H04W 52/267; H04W 52/343; H04W 64/00; H04W 72/0413; H04B 1/1027; H04B 17/29; H04B 17/309; H04L 1/0026; H04L 5/006; H04L 25/0204
  USPC .............................................. 455/422.1, 434
  See application file for complete search history.

(56) References Cited

U.S. PATENT DOCUMENTS

| | | | | |
|---|---|---|---|---|
| 6,360,097 | B1* | 3/2002 | Smith | H04W 48/16 340/7.42 |
| 6,483,815 | B1* | 11/2002 | Laurent | H04W 52/54 370/318 |
| 6,807,163 | B1* | 10/2004 | Shi | H04W 88/02 370/337 |
| 9,392,533 | B1* | 7/2016 | Vivanco | H04W 48/16 |
| 2008/0020748 | A1* | 1/2008 | Parker | H04W 76/028 455/423 |
| 2008/0058018 | A1* | 3/2008 | Scheinert | H04W 88/085 455/562.1 |
| 2008/0318643 | A1* | 12/2008 | Manna | H04W 52/0225 455/574 |
| 2010/0279638 | A1* | 11/2010 | Lindoff | H04L 25/0204 455/226.1 |
| 2010/0291921 | A1* | 11/2010 | Ruuska | H04W 24/00 455/426.1 |
| 2011/0269449 | A1* | 11/2011 | Kazmi | H04B 7/024 455/422.1 |
| 2012/0147772 | A1* | 6/2012 | Kazmi | H04L 5/0078 370/252 |
| 2012/0214540 | A1 | 8/2012 | Narasimha et al. | |
| 2012/0322440 | A1 | 12/2012 | Jeong et al. | |
| 2013/0017828 | A1* | 1/2013 | Weng | H04W 36/0083 455/434 |
| 2013/0090117 | A1* | 4/2013 | Ngai | H04W 52/0241 455/434 |
| 2013/0170418 | A1* | 7/2013 | Stauffer | H04W 52/0229 370/311 |
| 2013/0244657 | A1* | 9/2013 | Wang | H04W 36/24 455/436 |
| 2013/0324172 | A1* | 12/2013 | Ahn | H04W 36/0094 455/501 |
| 2013/0328726 | A1* | 12/2013 | Riley | G01S 5/02 342/451 |
| 2014/0335863 | A1* | 11/2014 | Wu | H04W 76/048 455/436 |
| 2015/0045020 | A1* | 2/2015 | Wang | H04W 36/0088 455/434 |
| 2016/0112970 | A1* | 4/2016 | Chen | H04W 52/38 455/522 |

FOREIGN PATENT DOCUMENTS

| | | |
|---|---|---|
| WO | 2012171542 A1 | 12/2012 |
| WO | 2013137700 A1 | 9/2013 |
| WO | 2013138605 A2 | 9/2013 |
| WO | 2013144433 A1 | 10/2013 |

* cited by examiner

METHODS OF ADAPTING MEASUREMENT RATE ACCOUNTING FOR CARRIER FREQUENCY

TECHNICAL FIELD

The disclosure pertains to the field of performing measurements on radio signals in a communication system. More particularly the disclosure relates to methods of adapting measurement rate accounting for operating frequency, as well as to a corresponding wireless device, network node and to corresponding computer programs.

BACKGROUND

Long Term Evolution, LTE, is the fourth-generation, 4G, mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In a UTRAN and an E-UTRAN, a User Equipment, UE, is wirelessly connected to a Radio Base Station, RBS, commonly referred to as a Node B, NB, in UMTS, and as an evolved Node B, eNodeB or eNodeB, in LTE. An RBS or access node is a general term for a radio network node capable of transmitting radio signals to a user equipment, UE, and receiving signals transmitted by a user equipment.

Currently, mobile communication technologies are evolving to very high frequency, larger carrier bandwidth, very high data rate and multiple heterogeneous layers. The future mobile network, also called 5G mobile network, is likely to be a combination of evolved 3G technologies, 4G technologies and emerging or substantially new components such as Ultra-Density Network, UDN. Due to the increasing demand to enhance wireless capacity and due to lack of availability of spectrum in lower frequency range, e.g. 800 MHz-3 GHz, the use of frequencies in 10's of GHz range are being investigated. Investigations are going on to explore the high frequency bands, for instance, in the range of 30 GHz, 60 GHz and 98 GHz for future mobile networks also known as 5G networks. At this frequency very large spectrum is available. This means both operating frequency and bandwidth for 5G networks are expected to be much higher than that used in the legacy mobile network e.g. 3G and 4G networks. However, due to large signal attenuation with respect to path loss, the network operating over such high frequencies is supposed to cover hotspot areas with densely deployed radio access nodes or base stations. Such dense deployment provides sufficient coverage for indoor called "hot areas".

Figure 1A:
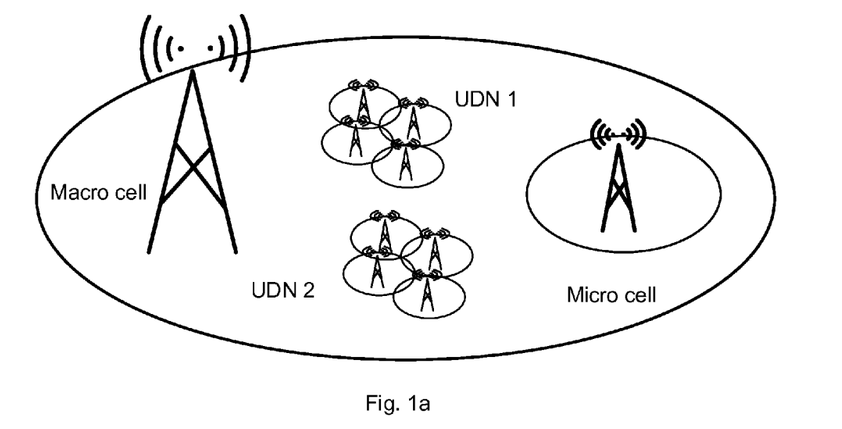
FIG. 1a illustrates an example of heterogeneous network.

FIG. 1a illustrates a heterogeneous network. The macro cell covers a large area. Within the area by the macro cell, there are a number of UDN network nodes, e.g. UDN node 1 (UDN1) and UDN node 2 (UDN2), and one micro cell.

In principle macro cells are supposed to cover most of area and micro/pico cell are supposed to boost the capacity and compensate the possible coverage holes within the macro cells. The UDN networks over very high frequencies are supposed to boost the capacity. The UDN network, macro cell and pico cells may also operate over different frequencies. A frequency is also interchangeably called as carrier, layer, frequency layer, channel or carrier frequency.

In existing mobile communication systems like in LTE the typical channel bandwidth varies between 5-20 MHz. But in in future systems like in UDN the channel bandwidth will be several times larger than in LTE in order to meet very high data rate requirements. Very large BW is achievable due to the availability of very large spectrum in very high frequency range. Frequencies in the range 30 to 300 gigahertz are often referred to as Extremely high frequency, EHF, Radio waves in this frequency range have wavelengths from about ten to around one millimeter, giving it the name millimeter band or millimeter wave, sometimes abbreviated MMW or mmW.

However the introduction of UDN will also significantly increase the UE power consumption due to 1) much large carrier bandwidth of millimeter wave, 2) large possible spectrum of UDN and 3) indoor/hot area deployment policy of UDN. The UE has to regularly measure on multiple cells on the serving and non-serving carrier frequencies for the purpose of mobility. Due to very dense deployment in UDN, the measurements also have to be done over very large number of cells. Therefore in UDN the measurements on larger BW will lead to significant increase in the UE power consumption. The existing mechanisms for cell detection/measurement are therefore not adequate for UDN operation with dense deployment and over very large BW.

The UE power consumption due to both cell detection and measurements of detected cells seriously impact the battery life. Therefore in LTE for both idle and connected states the Discontinuous Reception, DRX, cycle is used. The use of DRX cycle is one of the most viable methods to save UE battery life. In order to further enhance UE battery life, i.e. lower power consumption, there also exist solutions for further reducing power consumption in e.g. UDN networks. There are both network controlled methods and UE based methods as exemplified and explained below.

Existing Network Controlled UE Power Saving Methods

Patent application WO2013137700A1 discloses a method for reducing consumption of battery power of User Equipment, UE, during inter-frequency cell detection in a Heterogeneous Network with the assistance from the macro cell. The UE only starts to monitor the beacons, i.e. pilots, of certain small cells when the macro network indicates there are active small cells. Patent application US20120322440A1 discloses methods to limit the number of cells to measure for low mobility UEs so that the UE reception power can be saved via configuration with system information.

Existing UE Controlled Power Saving Methods

The UE based methods relies on UE to adapt its carrier monitoring. As a first example, a UE may stop monitoring other carriers when the radio quality of the present camped carrier is good enough. As a second example, a UE may decrease the measurement rate gradually for certain carrier or RAT.

The UE power saving method in this case is based on the assumptions of UE vendors i.e. UE implementation specific. The cell detection/measurement performance (accuracy and measurement delay requirements) may not be guaranteed.

Due to the above factor the UE power consumption and complexity for cell detection and measurement in UDN is expected to be much higher than in the current networks. The existing methods therefore cannot provide good enough power saving and/or guarantee the detection/measurement delay and/or accuracy.

Since the UDN are supposed to provide indoor coverage and hot area coverage, it will be difficult for the macro cell, e.g. LTE, to accurately determine the covered area of UDN even if the macro cell knows the deployment of UDN networks. When the macro cell informs the UE the existence of UDN coverage according to WO2013137700A1, a UE has to keep monitoring UDN cells in the area covered by the macro cell even though the UDN coverage is a small compared to the macro cell coverage, see FIG. 1a. In big cities where UDN network covers hotspot/indoor area, the power saving effect for UDN cell detection of this method can be clearly decreased. The method to limit the number of cells as disclosed in US20120322440A1 may then not be able to detect the strongest UDN cells in time.

Based on the above analysis, a more advanced power saving method to ensure the cell detection/measurement delay/accuracy for heterogeneous network operating on low frequency band and millimeter wave band is desired.

SUMMARY

An object of the present disclosure is to provide a wireless device which seeks to mitigate, alleviate, or eliminate one or more of the above-identified deficiencies in the art and disadvantages singly or in any combination and to provide a solution wherein nonlinear effects in the radio will not degrade the performance beyond a certain limit.

According to one aspect, the disclosure relates to a method, performed in a measuring node in a communication system, of performing one or more measurements on a radio signal. The method comprises obtaining a carrier frequency of at least one radio signal to measure, determining a measurement rate based on the obtained carrier frequency, and performing at least one measurement on the radio signal with the determined measurement rate. The mechanism in a wireless device of adaptive measurement rate as a function of the frequency range when doing cell measurement/detection in case of heterogeneous network operating on very high frequency range (e.g. mmW) leads to reduction in UE power consumption because the UE can measure less often in certain situations.

According to some aspects, the determining implies selecting a higher measurement rate for measuring on a radio signal transmitted on a first carrier frequency than for measuring on a radio signal transmitted on a second carrier frequency, wherein the first carrier frequency is lower than the second carrier frequency. This implies reduction in or minimal impact on UE complexity and processing while taking into account that the UE has to typically measure on very large number of densely deployed UDN radio nodes and/or on a very large bandwidth.

The mechanism of lowering the measurement rate at very high frequency does not degrade the overall measurement performance due to that typically the measurement bandwidth is very large at mmW frequency range. This large measurement bandwidth can compensate for slower measurement rate that leads to longer measurement time (i.e. longer L1 measurement period). An example of measurement performance is measurement accuracy e.g. measuring Reference Signal Received Power, RSRP, within an accuracy of ±2 dB, measuring Round Trip Time, RTT, within an accuracy of ±50 ns etc. Furthermore, a UE in a hotspot area (where radio nodes operate in very higher frequency range) is typically stationary or quasi-stationary. At very low speed longer measurement time due to slower rate will not degrade mobility performance.

According to some aspects, the determining comprises applying at least one rule defining which measurement rate to use based on the carrier frequency of the radio signal to measure. The performance of cell detection/measurement can be controlled according to well defined rules and/or by the network node. This leads to consistent UE measurement behavior.

According to some aspects, the at least one rule is autonomously selected by the measuring node. According to some aspects, the method comprises receiving the at least one rule from a network node. According to some aspects, the at least one rule is pre-defined in the measuring node. According to some aspects, the at least one rule maps different carrier frequencies to different measurement rates.

According to some aspects, the at least one rule implies selecting a higher measurement rate for measuring on a radio signal transmitted on a carrier frequency below a threshold value than for measuring on a radio signal transmitted on a carrier frequency above a threshold value.

According to some aspects, the measurement rate corresponds to how often the measuring node samples the radio signal for performing the measurements.

According to some aspects, the obtaining implies identifying the carrier frequency of at least one signal to measure.

According to some aspects, the carrier frequency is the uplink carrier frequency and/or downlink carrier frequency on which the radio signals are transmitted in the uplink and/or downlink respectively.

According to some aspects, the determining is further based on; a number of measurements to be at least partly performed in parallel or performed during at least a partly overlapping time period, a number of carrier frequencies on whose radio signals the measurements are to be performed, a bandwidth of the radio channel over which the measurement is to be performed or whether DRX is used and/or the length of DRX cycle.

According to some aspects, the method further comprises transmitting, to a network node, an indication that the measuring node is capable of obtaining a measurement rate based on the carrier frequency of a signal to measure and of using the obtained measurement rate for performing measurements.

According to some aspects, the method further comprises receiving, from a network node, a request defining a radio signal to perform measurements on.

According to other aspects, the disclosure relates to a measuring node, configured for performing one or more measurements on a radio signal. The measuring node comprises a radio communication interface for communication with at least one communication network and processing circuitry. The processing circuitry is configured to cause the measuring node to obtain a carrier frequency of at least one radio signal to measure, to determine a measurement rate based on the obtained carrier frequency, and to perform at least one measurement on the radio signal with the determined measurement rate.

According to some aspects, the determining implies selecting a higher measurement rate for measuring on a radio signal transmitted on a first carrier frequency than for measuring on a radio signal transmitted on a second carrier frequency, wherein the first carrier frequency is lower than the second carrier frequency.

According to some aspects, the measuring node is a wireless device or network node.

According to other aspects, the disclosure relates to a computer program comprising computer program code which, when executed in a measuring node, causes the measuring node to execute the methods described above.

According to other aspects, the disclosure relates to a method, performed in a network node in a communication system, of providing a measuring node performing one or more measurements on a radio signal with at least one measurement rate. The method comprises determining, based on a carrier frequency, at least one measurement rate to be used by the measuring node for measuring on at least one radio signal; and sending information associated with the determined measurement rate to the measuring node.

According to some aspects, the determining implies selecting a higher measurement rate for measuring on a radio signal transmitted on a first carrier frequency than for measuring on a radio signal transmitted on a second carrier frequency, wherein the first carrier frequency is lower than the second carrier frequency.

According to some aspects, the method further comprises obtaining at least one carrier frequency of at least one radio signal to be measured. Then the information is the determined measurement rate for respective radio signal.

According to some aspects, the information comprises one or more rules defining which measurement rate to use based on the carrier frequency of the radio signal to measure.

According to some aspects, the determining is further based on a number of measurements to be at least partly performed in parallel or performed during at least a partly overlapping time period, a number of carrier frequencies on whose radio signals the measurements are to be performed, a bandwidth of the radio channel over which the measurement is to be performed, or whether DRX is used and/or the length of DRX cycle.

According to some aspects, the method further comprises receiving, from the measuring node, an indication that the measuring node is capable of obtaining a measurement rate based on the carrier frequency of a signal to measure and of using the obtained measurement rate for performing measurements.

According to other aspects, the disclosure relates to a computer program comprising computer program code which, when executed in a network node, causes the network node to execute the methods.

According to other aspects, the disclosure relates to a network node being adapted to configure a measuring node for performing one or more measurements on a radio signal. The network node being configured to determine, based on a carrier frequency, at least one measurement rate to be used by the measuring node for measuring on at least one radio signal; and to send information associated with the determined measurement rate to the measuring node.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

ABBREVIATIONS

AN access node
BS Base Station
CGI Cell global ID
CID Cell Identity
CRS Cell-specific Reference Signal
DAS Distributed Antenna System
DL Downlink
ID Identity
L1 Layer 1
L2 Layer 2
LTE Long Term Evolution
PCI Physical cell ID
PRS Positioning reference signal
PSS Primary Synchronization Signal
RAT Radio Access Technology
RE Resource Element
RB Resource Block
RRH Remote radio head
RRM Radio Resource Management
RRU Remote radio unit
RSRQ Reference signal received quality
RSRP Reference signal received power
SRS Sounding Reference Signal
SSS Secondary Synchronization Signal
UE User Equipment
UL Uplink
SON Self Organizing Network
RSSI Received signal strength indicator
O&M Operational and Maintenance
OSS Operational Support Systems
UDN ultra-dense network Aspects of the present disclosure will be described more fully hereinafter with reference to the accompanying drawings. The apparatus and method disclosed herein can, however, be realized in many different forms and should not be construed as being limited to the aspects set forth herein. In this disclosure we specifically address the dual SIM card scenario, but the same technique can easily be adapted to a multiple SIM card scenario by someone skilled in the art. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

The term wireless device herein can be a UE or a radio network node. The UE can be a wireless device, sensor, modem, smart phone, machine type, MTC, device also known as machine to machine, M2M, device, target device, Device to device, D2D, UE, PDA, iPad, Tablet, smart phone, laptop embedded equipped, LEE, laptop mounted equipment, LME, USB dongles etc.

The term network node herein can be a UDN access point, eNodeB, NodeB, Base Station, BS, wireless Access Point, AP, base station controller, radio network controller, relay, donor node controlling relay, base transceiver station, BTS, transmission points, transmission nodes, RRU, RRH, nodes in Distributed Antenna System, DAS, core network node, MME etc.

Some of the example embodiments presented herein are directed towards methods performed in a measuring node of performing one or more measurements. As part of the development of the example embodiments presented herein, a problem will first be identified and discussed.

As discussed above, the UE power consumption, UE complexity, UE memory requirements and UE processing may substantially increase due to the UE radio measurements performed in UDN operating in millimeter wave frequency range i.e. on signals transmitted by UDN radio nodes. This is because the UDN operating in mmW bears brings about several characteristics.

Firstly, at millimeter wave, mmW, there is a large spectrum, and so UE has to measure or scan several 10's of GHz. A larger bandwidth to scan implies longer time to scan and more resources are required.

The carrier bandwidth is very large for mmW communication, e.g. 1 GHz or 2 GHz. This means the measurement bandwidth will also be proportionally large. Furthermore, UDN nodes are very closely deployed. A dense deployment implies that a UE has to search and measure on a large number of cells and thereby possibly on a large number of carriers.

Within heterogeneous network or within UDN, a UE regularly detects or identifies new cells and measures the already detected cells operating on one or plurality of frequency layers. The measurements are done on reference signals transmitted by the cells. Examples of measurements are cell identification, also known as detection, signal strength, e.g. Reference Signal Received Power, RSRP, and signal quality, e.g. Reference Signal Received Quality, RSRQ. The cell identification may comprise of acquisition of physical cell ID, PCI, and/or Cell global ID, CGI. The measurements are done on known reference signals or discovery signals, such as Cell-specific Reference Signal, CRS, Primary/Secondary Synchronization Signal, PSS/SSS, Positioning Reference Signal, PRS, etc.

The measurements are done in both low activity and high activity states of the UE. Examples of low activity and high activity states are idle and connected states respectively. The measurements are used by the UE for autonomous functions like cell selection and cell reselection in idle state. In connected state the measurement results are used by the UE for some operation and are also reported to the network node e.g. serving network node, positioning node etc. The serving network node uses the measurements for mobility purposes such as for cell change. Example of cell change is performing handovers, Radio Resource Control, RRC, connection release with redirection etc. The positioning node uses the measurements for determining the UE location. For example the network may serve the UE with the best cell based on signal strength and/or signal quality. The out of sync and in sync detection performed by the UE on serving cell for the Radio Link Monitoring, RLM, are also considered to be UE radio measurements. The UE may also perform measurements, e.g. Reference Signal received Time Difference, RSTD, between pair of cells), UE, Receive to Transmit, Rx-Tx time difference, Round Trip Time, RTT, propagation delay etc. for other functions such as positioning.

Typically, the UE radio measurements consist of the following 3 types; Intra-frequency measurements, Inter-frequency measurement and Inter-Radio Access Technology, RAT, measurements.

Intra-frequency measurements are performed by the UE on cells on the serving carrier frequency. In case of carrier aggregation the UE may perform intra-frequency measurements on more than one serving carrier i.e. on primary and secondary carrier(s). In this case the UE is required to perform measurements on multiple cells, e.g. 8 cells per serving carrier, in parallel over the same measurement time period, also known as L1 measurement period.

Inter-frequency measurements are performed by the UE on cells on the non-serving carrier frequency of the same RAT as of the serving carrier frequency. In order to detect a cell or measure a detected cell on inter-frequency carrier the UE typically needs measurement gaps. However the UE with multiple receivers may measure also inter-frequency carriers without gaps.

Inter-RAT measurements are performed by the UE on cells on the non-serving carrier frequency of the RAT different than that of the serving carrier frequency. In order to detect a cell or measure a detected cell on inter-RAT carrier the UE typically needs measurement gaps. However the UE with multiple receives may also be able to measure inter-RAT carriers without gaps.

One important aspect of UDN is transmission of multiple Giga-bps data rate over millimeter wave. The proposed technique is taking into account the following. Due to the large attenuation in mmW compared to that in case of low frequencies, each UDN Access Node, AN, may only cover a small area. More, the mmW may be difficult to cover shadow area due to weak diffraction. This means the UDN ANs will be very densely deployed in order to provide sufficient coverage and reduce shadow area. Furthermore, large carrier bandwidth: In order to provide multiple Giga-bps data rate, the carrier bandwidth can be very larger e.g. up to 1 GHz or 2 GHz. A UDN may operate using licensed carriers, licensed but shared carriers or unlicensed carriers. Large spectrum is available for UDN deployments. An access node may change to operate over a different channel in order to mitigate the interference from other nodes or other networks. Hence, the UDN is not expected to provide universal coverage. It is supposed to provide indoor coverage and coverage in hot spot areas.

The above characteristics of UDN networks bring even greater challenge to the UE power consumption due to cell detection and radio measurements.

The proposed technique is based on the idea to use an adaptive measurement rate in the UE, i.e. an adaptive measurement sampling rate, for doing measurements on one or more cells. The adaptation of the measurement rate is made dependent upon the frequency range of a cell over which the measurement is done by the UE. For example the UE uses a first measurement rate R1 for doing measurement on a first cell operating on a first frequency which is below a certain threshold e.g. 10 GHz and a second measurement rate R2 for doing measurement on a second cell operating on a second frequency which is equal to or above a certain threshold e.g. 10 GHz, and wherein R2>R1.

The adaptation of the measurement rate in the UE or in any measuring node is based on one or more pre-defined rules and/or indications received from the network node or based on UE autonomous determination. The adaptation of the measurement rate can be generalized for more than two frequency ranges. The method is applicable to any type of radio measurements including cell detection or cell identification, signal measurements such as signal strength or signal quality, timing measurement such as Reference Signal received Time Difference, RSTD, Round Trip Time, RTT, channel state information Channel Strength Indicator, CSI, measurements such as Channel Quality Indicator, CQI, etc.

The disclosure presents a method implemented in a measuring node of adapting measurement rate as a function of a frequency of a cell and of using the adapted measurement rate for performing measurement on that cell.

Figure 5:
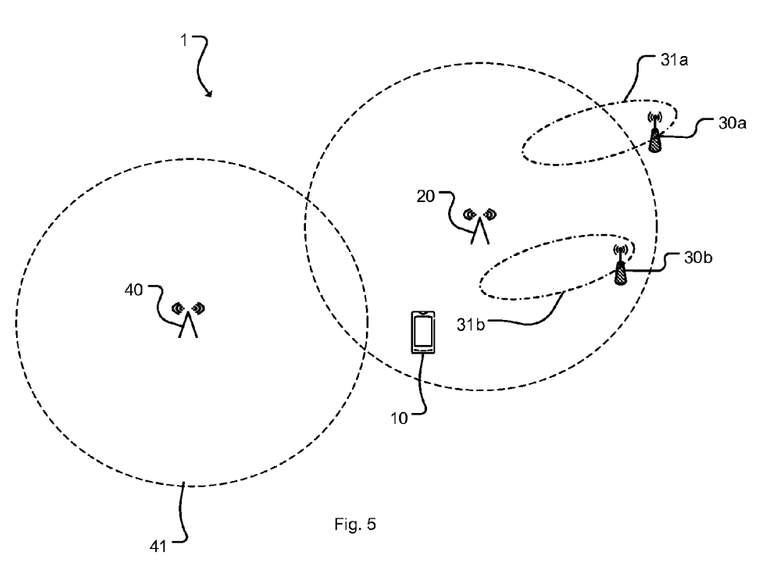
FIG. 5 illustrates a system wherein the proposed methods may be implemented.

FIG. 5 illustrates a communication system wherein the proposed methods may be implemented. This example comprises two eNodeBs 20 and 40. Each eNodeB is defining a Macro cell 21, 41, typically operating on a LTE frequency band. The system also comprises two small cells 31a, 31b, defined by two small cell base stations 30a, 30b. It may be assumed that these small cell base stations are 5G base stations operating on the mmW frequencies. A wireless device 10, here a smartphone is connected to one of the eNodeBs 20. The proposed method performed in a measuring node of performing one or more measurements may be implemented in the wireless device 10. The wireless device 10, has to regularly measure on multiple cells on the serving and non-serving carrier frequencies for the purpose of mobility. In this example, the wireless device may be requested to perform measurements on reference signals transmitted by base stations 40, 30a and 30b.

Figure 6:
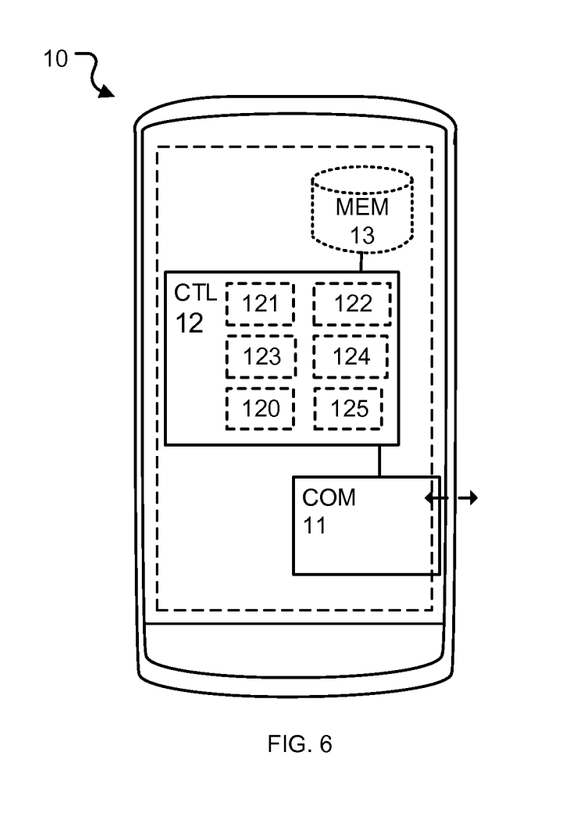
FIG. 6 is an example node configuration of a wireless device, according to some of the example embodiments.

FIG. 6 illustrates an example of a measuring node 10 which may incorporate some of the example embodiments discussed above and below. In this example, the measuring node is a wireless device, but in principle, the methods may be implemented in any node performing measurements in a communication system. The communication system is e.g. a cellular communication system or a next generation mobile communication system or a combination thereof. According to some aspects, the measuring node is a wireless device or network node. As shown in FIG. 6, according to aspects, the measuring node 1 comprises a radio communication interface or radio circuitry 11 configured to receive and transmit any form of communications or control signals within a network. It should be appreciated that the radio circuitry 11 according to some aspects comprises any number of transceiving, receiving, and/or transmitting units or circuitry. It should further be appreciated that the radio circuitry 11 may be in the form of any input/output communications port known in the art. The radio circuitry 12 according to some aspects comprises RF circuitry and baseband processing circuitry (not shown).

Figure 2:
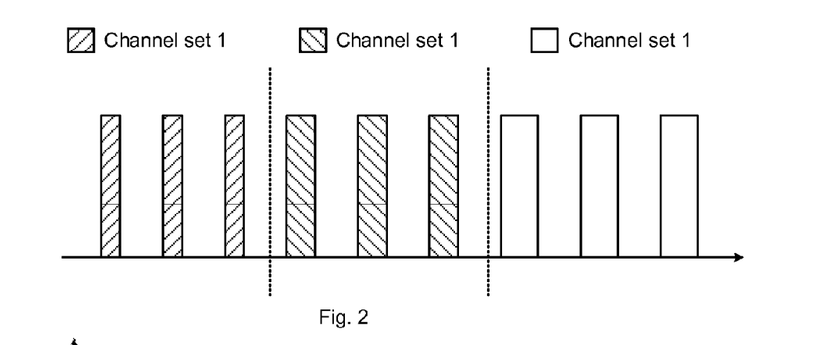
FIG. 2 shows multiple groups of radio channels.

According to some aspects, the radio circuitry 11 is capable of performing measurements on signals operating on at least two groups of radio channels: a first group and a second group. In practice there can be multiple groups of radio channels as shown in FIG. 2. The first and second groups of radio channels operate on a first frequency range (Δf1) and a second frequency range (Δf2) respectively. For the simplicity it is further assumed that one radio channel of the first group and one radio channel of the second group operate on a first carrier frequency (f1) and a second carrier frequency (f2) respectively. The frequency of the second group of radio channels is higher than that of the first group of radio channels. That means f2>f1.

The measuring node 1 according to some aspects further comprises at least one memory unit or circuitry 13 that may be in communication with the radio circuitry 11. The memory 13 may be configured to store received or transmitted data and/or executable program instructions. The memory 13 may be any suitable type of computer readable memory and may be of volatile and/or non-volatile type.

The processing circuitry 12 is any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but may be provided as any number of units or circuitry.

Figure 7:
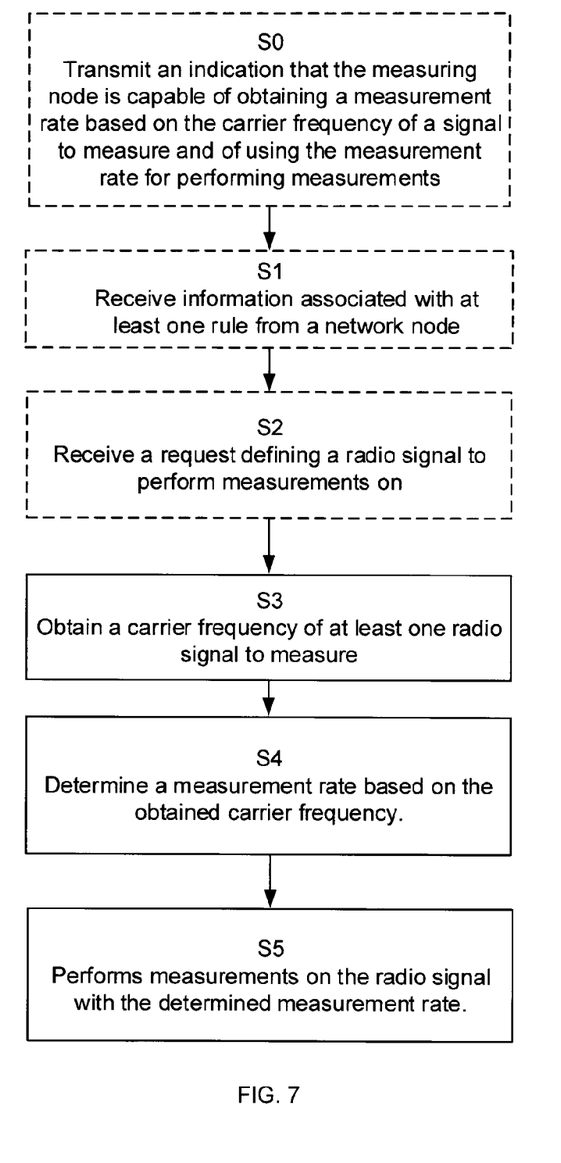
FIG. 7 illustrates method steps performed in a wireless device.

FIG. 7 is a flow diagram depicting example operations which may be taken by the measuring node of FIG. 6, when performing measurements on a radio signal.

It should be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

The proposed technique of performing measurements will now be briefly described referring to FIGS. 6 and 7. According to some aspects, the disclosure relates to a method in a measuring node 10, in a communication system 1, of performing one or more measurements on a radio signal. The signal to be measured is e.g. a reference signal, RS, transmitted in a serving cell and/or one or more neighbor cells. The RS may interchangeably called as pilot signal, discovery signal etc. Examples of RS are primary synchronization signal, PSS, secondary synchronization signal, SSS, Cell-specific Reference Signal, CRS, MBSFN reference signal, UE-specific Reference Signal, DM-RS, demodulation reference Signal, DM-RS, positioning Reference Signal, PRS, CSI Reference Signal, CSI-RS, etc.

The processing circuitry is configured to cause the measuring node to perform these steps. For the sake of consistency we use a generic term 'measurement', which covers all types of radio measurement performed by a measuring node on the radio signals, The radio signals can be transmitted by and/or received at the measuring node e.g. from a radio network node or from another measuring node. For example the measurement herein can be cell detection, signal strength, signal quality, timing measurement, radio link monitoring, Cell Global ID acquisition, CSI report etc.

The term 'operate', herein means signals transmitted and/or received by the measuring node. The measuring node can perform measurements on the received signals, e.g. synchronization signals, reference signals and/or on transmitted signals, e.g. sounding reference signals. The measuring node may transmit signals towards and/or received signals from a network node, e.g. UDN access node, base station.

According to some aspects, the method is initiated by transmitting S0, to a network node, an indication that the measuring node is capable of obtaining a measurement rate based on the carrier frequency of a signal to measure and of using the obtained measurement rate for performing measurements. The processing circuitry 12 is configured to transmit S0 an indication, using the radio communication interface 11. The indication is transmitted by the measuring node to the network node as part of the measuring node's radio access capability information. The capability information can be transmitted by the measuring node autonomously or in response to the request received from the network node. The indication may be applicable for all types of measurements or the indication may be applicable to or associated with one or more types of measurements e.g. mobility measurements such as Reference Signal Received Power, RSRP, and/or Reference Signal Received Quality, RSRQ. The indication may also be applicable for all frequency bands supported by the measuring node or the indication may be applicable to or associated with subset of frequency bands supported by the measuring node e.g. bands above 2 GHz. According to some aspects, the measuring node comprises a transmitter module 120 configured for this purpose.

The network node uses the received the measuring node's radio access capability information for one or more objectives. The network node may store the received information and use it in future.

The received information could be used e.g. for deciding whether to transmit information related to the adapted measurement rate(s) as a function of carrier frequency to the measuring node or not. For example the information related to the adapted measurement rate(s) is only transmitted to the measuring node if the measuring node indicates that it is capable of obtaining a measurement rate based on the carrier frequency of a signal to measure and of using the obtained measurement rate for performing the measurement. In this way the network node can avoid sending such information to the measuring node that does not support such capability and thereby reducing signaling overheads.

Another example is that the network node transmits the received information partly or fully to another network node. For example if the network node that receives the capability information is a radio network node such as base station, then it may transmit the said information to another radio network node and/or to a core network node, e.g. a MME. In another example if the network node that receives the capability information is a core network node (e.g. a Mobility Management Entity, MME) then it may transmit the said information to another core network node and/or to a radio network node (e.g. base station).

According to some aspects, the method then typically comprises receiving S2 a request defining a radio signal to perform measurements on. The serving base station may e.g. request a UE to measure on certain cells. The cells may belong to the serving and/or to the non-serving carrier frequencies. The processing circuitry 12 is configured to receive, using the radio communication interface 11, the request defining a radio signal to perform measurements on. According to some aspects, the measuring node comprises a second receiver module 122 configured for this purpose. Alternatively the measurement may be autonomously triggered in the measuring node. In any case, the measuring node receives a request from its higher layer to perform one or more radio measurements on one or more signals operating on the first carrier frequency f1 or the second carrier frequency f2 or on both f1 and f2 respectively.

In step S3, the measuring node obtains a carrier frequency of at least one radio signal to measure. According to some aspects, the obtaining S3 implies identifying the carrier frequency of at least one signal to measure. The processing circuitry 12 is configured to obtain a carrier frequency of at least one radio signal to measure. According to some aspects, the measuring node comprises an obtainer 123 configured for this purpose. According to some aspects, the carrier frequency is the uplink carrier frequency and/or downlink carrier frequency on which the radio signals are transmitted in the uplink and/or downlink respectively, see e.g. 3GPP TS 36.101 V12.0.0 (2013-07).

In step S4, the measuring node determines a measurement rate based on the obtained carrier frequency. The processing circuitry 12 is configured to determine a measurement rate based on the obtained carrier frequency. According to some aspects, the measuring node comprises a determiner 124 configured for this purpose. The determining may be performed in different ways as will be exemplified below.

Figure 1B:
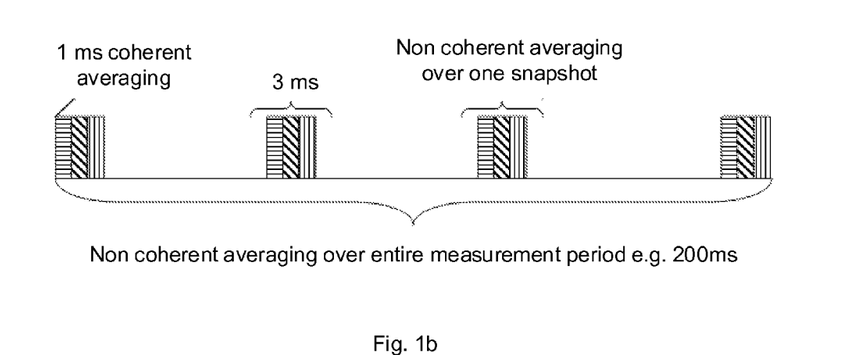
FIG. 1b shows an example of Reference Signal Received Power averaging.

According to some aspects, the measurement rate corresponds to how often the measuring node samples the radio signal for performing the measurements. Each measurement may last variable length of time and/or comprise several snapshots. Hence, the term 'measurement rate', herein means how frequently or how often the measuring node samples a signals (also known as obtains a measurement sample) or takes a snapshot of a signal. The measuring node typically samples two or more snapshots during a physical layer measurement period for a particular measurement as explained further below. The measurement rate can be expressed as a number of samples or snapshots obtained per unit time e.g. 5 measurement samples per 200 ms or 25 samples per second as for RSRP/RSRQ in LTE. As example of RSRP averaging using 4 snapshots each of 3 ms over 200 ms is shown in FIG. 1*b*.

According to some aspects, the determining S4 implies selecting a higher measurement rate for measuring on a radio signal transmitted on a first carrier frequency than for measuring on a radio signal transmitted on a second carrier frequency, wherein the first carrier frequency is lower than the second carrier frequency. For example a lower measurement rate is used for measuring on a higher carrier frequency band than for a lower frequency carrier band. Further examples will follow below.

In step S5, the measuring node performs measurements on the radio signal with the determined measurement rate. The processing circuitry 12 is configured to perform measurements on the radio signal with the determined measurement rate, using the radio communication interface 11. According to some aspects, the measuring node comprises a performer 125 configured for this purpose.

It is further anticipated that the measuring node is in some embodiments configured to measure on several radio signals in parallel. Then the proposed methods are performed in parallel on different signals.

Figure 3:
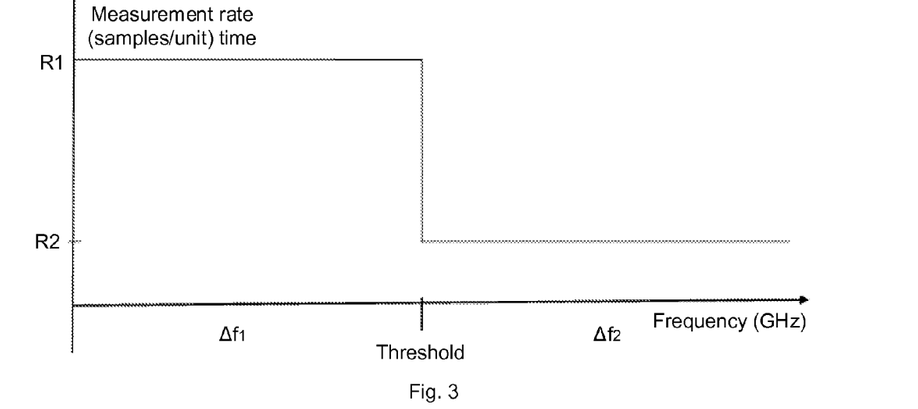
FIG. 3 illustrates that measurement rate for measuring on signals of the second group of radio channels is lower than the measurement rate used for measuring on signals of the first group of radio channels.
Figure 4:
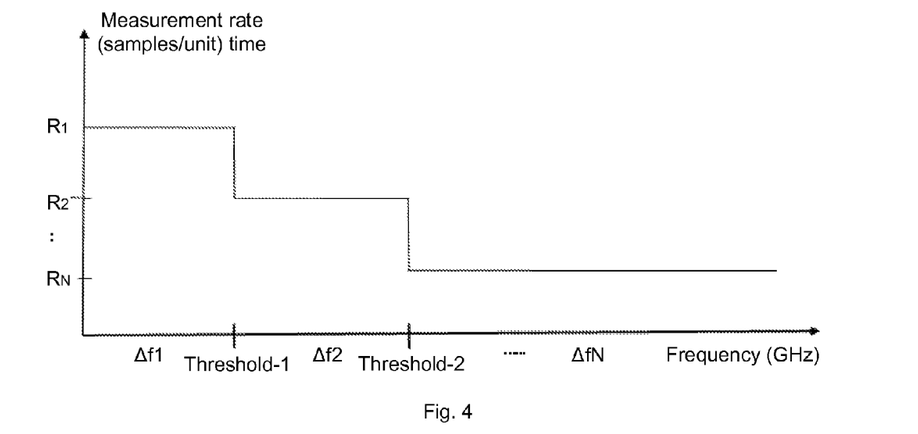
FIG. 4 illustrates the methods being generalized for N frequency ranges and corresponding N measurement rates.

In one embodiment, in response to receiving the request from higher layers, the measuring node retrieves from its memory measurement rates R1 and R2 with which it should measure on f1 and f2 and wherein R2<R1. In other words the measurement rate for measuring on signals of the second group of radio channels is lower than the measurement rate used for measuring on signals of the first group of radio channels. This is illustrated in FIG. 3. The principle can be generalized for N frequency ranges ($\Delta f1, \Delta f2, \ldots, \Delta fN$) and corresponding N measurement rates as shown in FIG. 4. The measurement is done over certain measurement time, T0, which is commonly known as L1 measurement period or physical layer measurement period. During an L1 measurement period the measuring node obtains multiple samples or snapshots which are generally equally spaced in time. For example, in existing solutions the measuring node typically takes 4 or 5 snapshots over L1 measurement period of 200 ms. In this example the measurement rate is 1 snapshot per 40 ms or 50 ms. However, in the existing solution the measurement rate is the same regardless of the frequency of the signals i.e. same for all existing frequency bands. But in the present disclosure compared to the existing solution, the measurement rate is slower for measuring on signals operating in higher frequency ranges e.g. mmW. The slower measurement rate also enables the measuring node to measure on larger number of cells, or signals of radio nodes, in parallel, i.e. during the same L1 measurement period. This will enable the measuring node to reduce power consumption and implementation complexity. Since the measurement bandwidth is typically much larger than in the existing solution, therefore the measurement accuracy will not be degraded due to slower measurement rate.

Hence, according to the proposed technique, the measuring node performs measurements on signals operating on at least one of f1 and f2 with measurement rates R1 and R2 respectively. Thereafter, the measuring node typically uses the measurement for one or more radio operational tasks e.g. for cell selection or reselection, for reporting them to the network node etc.

Hence, the principle may be summarized as that the determining S4 comprises applying at least one rule defining which measurement rate to use based on the carrier frequency of the radio signal to measure. Rules are e.g. thresholds, formulas or tables that are used to determine a measurement rate to use. According to some aspects, the at least one rule maps different carrier frequencies to different measurement rates.

According to some aspects, the at least one rule is autonomously selected by the measuring node. This aspect implies that the measuring node may itself select or configure the rules to apply.

Alternatively, the method in introduced by an initial step of receiving S1 information associated with the at least one rule from a network node. The processing circuitry 12 is configured to receive information associated with the at least one rule from a network node. According to some aspects, the measuring node comprises a first receiver module 121 configured for this purpose. This variant implies that the measuring node is instructed by the network regarding the measurement rates to use. The network typically comprises a good overview of the radio environment and my thus provide rules that are optimized in terms of current consumption, performance etc.

According to some aspects, the at least one rule is pre-defined in the measuring node. One possibility is to use fixed e.g. standardized, measurement rates for different frequency bands. Hence, the measuring node could e.g. comprise hard coded table.

According to some aspects, the at least one rule implies selecting a higher measurement rate for measuring on a radio signal transmitted on a carrier frequency below a threshold value than for measuring on a radio signal transmitted on a carrier frequency above a threshold value.

The radio frequency range of future radio according to the current understanding will be within 6~100 GHz. For instance, the threshold could be 6 GHz, 30 GHz, corresponding to, most frequent<6 GHz; future Radio Access Technologies, less frequent 6~30 GHz; even less frequent, >30 GHz. According to some aspects, the threshold value is between 5 GHz and 30 GHz. A threshold may thus be fixed or hardcoded, but may as well be updated either by the measuring node or by a network node.

In the determination step, the measurement rate may further be adapted based on one or more additional criteria.

According to some aspects, the determining S4 is further based on a number of measurements to be at least partly performed in parallel or performed during at least a partly overlapping time period. This implies taking into account, the number of radio channels or carrier frequencies to be measured by the measuring node in parallel or during an overlapping time. For example the measurement rate can be scaled, i.e. decreased, linearly with the number of radio channels on whose signals the measurement node is required to measure during an overlapping time.

According to some aspects, the determining S4 is further based on a number of carrier frequencies on whose radio signals the measurements are to be performed. According to this variant, the number of radio nodes per radio channel (or number of cells per carrier frequency in LTE terminology) is considered. For example if the measuring node has to measure on more than certain number of radio nodes on the same radio channels then the measurement rate can be further decreased e.g. with respect to measurement rate R2.

According to some aspects, the determining S4 is further based on a bandwidth of the radio channel over which the measurement is to be performed. For example if the bandwidth of the radio channel over which measurement is done is above a threshold then the measurement rate is not further adapted. But if the measurement bandwidth is equal to or below the threshold then the measurement rate is further adapted i.e. increased to enhance the measurement accuracy.

According to some aspects, the determining S4 is further based on whether DRX is used and/or the length of DRX cycle. If DRX cycle is used then the measurement rates is further reduced to allow the measuring node to save its power consumption. The level of reduction also depends upon the length of DRX i.e. more reduction in measurement rate if DRX cycle is longer. Examples of shorter DRX cycles are DRX cycles between 2 ms to 40 ms. Examples of longer DRX cycles are DRX cycles greater than 40 ms and in particular DRX cycles larger than 640 ms. This is done to enable UE power saving.

An embodiment describing the method in the measuring node of autonomously adapting or selecting a measurement rate based on the frequency range of the signals on which the measurement is done will now be presented. The autonomous adaptation of measurement rate can be based on pre-defined rule or purely on UE autonomous decision. Typically such rules are pre-defined for measurements done by the measuring node in idle state for cell selection and cell reselection. However similar pre-defined rules can be specified for measurements done by the measuring node being in connected state.

For example in existing solutions in idle mode the cell detection time ($T_{detect}$), measurement time ($T_{measure}$) and cell reselection delay ($T_{reselection}$) are pre-defined as a function of DRX cycle length of the measuring node. These pre-defined measurement times require the measuring node to measure at certain measurement rate depending on the DRX cycle length but regardless of the frequency band or frequencies with the band.

Using the method of this disclosure the measurement rates for idle mode related measurements can be expressed as a function of the frequency of the measured signal and the measuring node' DRX cycle length. This principle is illustrated in tables 1 and table 2. The table 1 contains the measurement times for different types of measurements in idle mode when measured signal is on the first frequency f1. The table 2 contains the measurement times for the corresponding measurements in idle mode when the measured signal is on the second frequency f2. The frequency f2 is higher than frequency f1. As shown in table 2 the corresponding measurement times in table 2 are lower than those on table 1. Typically the measuring node has to measurement few times during the specified measurement time. For example in LTE it is pre-defined in the standard that the UE shall measure RSRP and RSRQ at least once per $T_{measure}$. This means for measuring on signals on f2 the measuring node can use lower measurement rate than used for measuring on signals on f1.

The radio nodes at higher frequency (e.g. mmW range) operate in hotspots and indoor environment therefore the speed of the measuring node (i.e. UE) is much slower than the typical UE speed in macro or in outdoor environment. Therefore slower measurement rates used for measurements on signals with higher frequency is not expected to degrade mobility performance.

TABLE 1

Examples of measurement rates for measuring signals on lower carrier frequency f1

| DRX cycle length [sec] | $T_{detect}$ [sec] (number of DRX cycles) | $T_{measure}$ [sec] (number of DRX cycles) | $T_{reselection}$ [sec] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |

TABLE 2

Examples of measurement rates for measuring signals on higher carrier frequency f2

| DRX cycle length [sec] | $T_{detect}$ [sec] (number of DRX cycles) | $T_{measure}$ [sec] (number of DRX cycles) | $T_{reselection}$ [sec] (number of DRX cycles) |
|---|---|---|---|
| 0.32 | 23.04 (72) | 2.56 (8) | 10.24 (32) |
| 0.64 | 35.84 (56) | 2.56 (4) | 10.24 (16) |
| 1.28 | 64 (50) | 2.56 (2) | 12.8 (10) |

Turning to FIG. 6, transmitter module 120, the first receiver module 121, the second receiver module 122, the obtainer 123, the determiner 124 and the performer 125 are implemented in hardware or in software or in a combination thereof. The modules 120, 121, 122, 123, 124 and 125 are according to some aspects implemented as a computer program stored in a memory 13 which run on the processing circuitry 12. The measuring node 10 is further configured to implement all the aspects of the disclosure as described in relation to the methods above. The measuring node 10 also comprises the corresponding modules. Hence, according to one aspect the disclosure relates to a computer program comprising computer program code which, when executed in a measuring node, causes the measuring node 10 to execute the methods described above and below.

Figure 8:
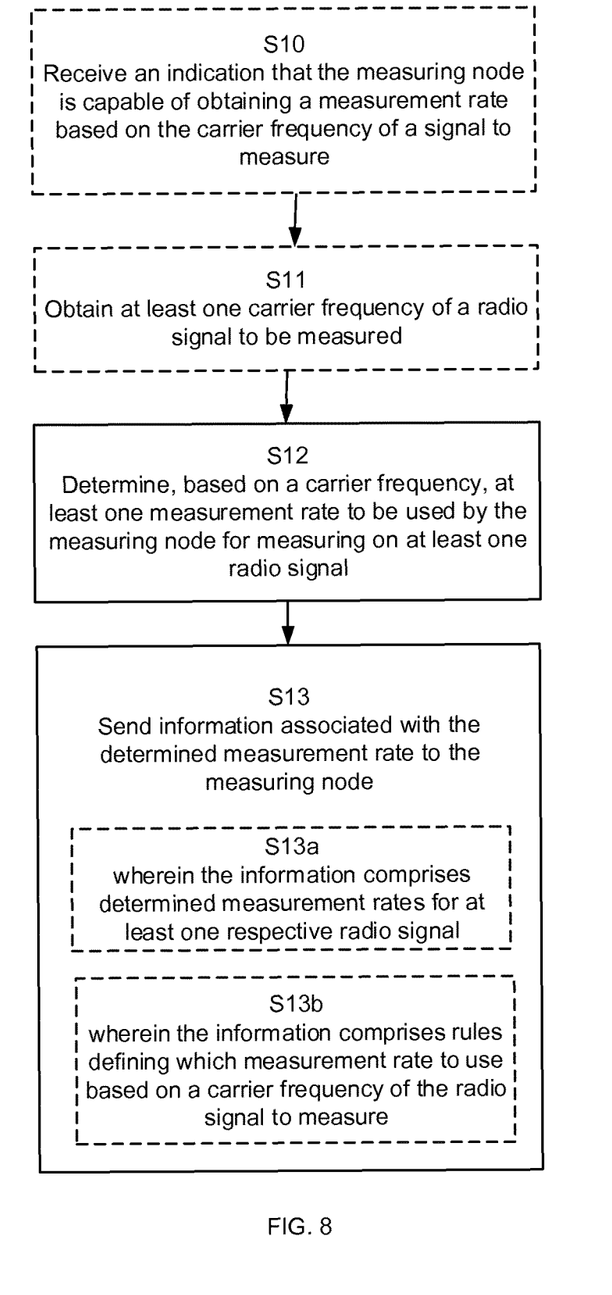
FIG. 8 illustrates method steps performed in a network node.
Figure 9:
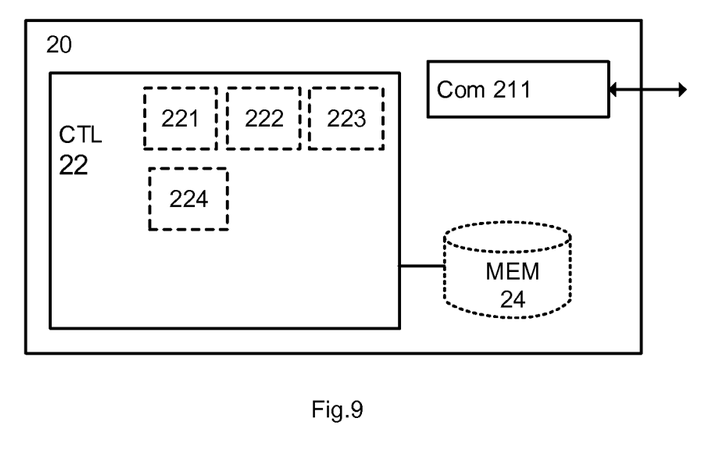
FIG. 9 is an example node configuration of a network node, according to some of the example embodiments.

Turning now to FIGS. 8 and 9 a method in a network node for configuring a measuring node with a measurement rate will be described, which depends upon the frequency range of the signals on which the measurement is done by the measuring node. The network node configures the measuring node according to the principle as described above.

FIG. 9 illustrates an example of a network node 1 of being adapted to configure a measuring node for performing one or more measurements on a radio signal.

The network node 20 according to aspects, comprise at least one memory or memory circuitry 24. The memory 24 is configured to store received or transmitted data and/or executable program instructions. The memory 24 may be any suitable type of computer readable memory and may be of volatile and/or non-volatile type.

The network node 20 further comprises a communication interface 211 configured to communicate with measuring nodes 10 within reach of the network node and processing circuitry 22 or controller 22. The processing circuitry 22 is configured to cause the network node 20 to determine, based on a carrier frequency, at least one measurement rate to be used by the measuring node for measuring on at least one radio signal; and to send information associated with the determined measurement rate to the measuring node.

The processing circuitry 22 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

FIG. 8 is a flow diagram depicting example operations which may be taken by the network node 20 of FIG. 9, when configuring a measuring node for performing one or more measurements on a radio signal, which can be serving or neighboring cell.

According to some aspects, the method is initiated by the network node receiving S10, from the measuring node, an indication that the measuring node is capable of obtaining a measurement rate based on the carrier frequency of a signal to measure and of using the obtained measurement rate for performing measurements. The processing circuitry 22 is configured to receive S10 the indication. According to some aspects, the measuring node comprises a receiver module 220 configured for this purpose.

According to some aspects, the measurement rate for a particular signal is determined in the network node and then sent to the respective measuring node. For example, the network node requests that terminal 10 of FIG. 5 measures on reference signals transmitted in cells 31a and 31b. The network node 20 may then as well determine the specific rate for measuring on these signals. According to this aspect, the method is initiated by obtaining S11 at least one carrier frequency whose of a radio signal to be measured. The processing circuitry 22 is configured to obtain at least one carrier frequency of at least one radio signal to be measured; wherein the information is the determined measurement rate for respective radio signal. According to some aspects, the measuring node comprises an obtainer 221 configured for this purpose. One or more cells operate on a carrier frequency. Therefore the measuring node may be configured to perform one or more measurements on one or more cells (e.g. serving and/or neighboring cells) operating on the carrier frequency.

In step S12, the network node determines, based on a carrier frequency, at least one measurement rate to be used by the measuring node for measuring on at least one radio signal. The processing circuitry 22 is configured to determine S12 the measurement rate. According to some aspects, the measuring node comprises a determiner 222 configured for this purpose.

In step S13, the network node sends associated with the determined measurement rate to the measuring node. The processing circuitry 22 is configured to sends the information. According to some aspects, the measuring node comprises a sender 223 configured for this purpose. The network node configures the measuring node according to the principle as described above in connection with the measuring node.

If the measurement rate for a specific signal has been determined in the network node, then the sent information is S13a the determined measurement rate for each respective radio signal. Hence, according to one aspect the network node calculates a measurement rate and sends it to the measuring node.

According to other aspects, the sent information comprises rules S13b defining which measurement rate to use based on a carrier frequency of the radio signal to measure. Hence, as an alternative, the network node sends information which enables the measuring node to determine the measurement rate. Such information may e.g. be the rules mapping carrier frequency bands to a certain measurement rates as described above. This implies that the network node sends "rules" to the measuring node, which calculates the frequency using the rules.

According to some aspects, the determining S12 implies selecting a higher measurement rate for measuring on a radio signal transmitted on a first carrier frequency than for measuring on a radio signal transmitted on a second carrier frequency, wherein the first carrier frequency is lower than the second carrier frequency.

The proposed methods enables the measuring node to measure with measurement rates R1 and R2 on signals on carrier frequencies f1 and f2 respectively; where f1<f2 and R2<R1. The advantage of the network configurable rates as opposed to the pre-defined approach is the flexibility in adapting the measurement rate as a function of frequency and also based on additional criteria. For example if the network node wants the measuring node to perform measurement on larger number of radio channels which also belong to the second group of frequency range then the measurement rate can further be even lowered below measurement rate R2 e.g. R2'.

In another aspect the measurement rates to be used by the measuring nodes for different ranges of frequencies are implicitly specified based on one or more configurable measurement requirements e.g. measurement time, measurement accuracy etc. For example the network node may configure the measuring node with a first measurement period (L11) and a second measurement period (L12) for doing a measurement on signals operating on a first carrier frequency f1 and a second carrier frequency f2 respectively. In this example it is assumed that L11<L12 and f1<f2 as before. In order to meet the configurable measurement requirements the measuring node may autonomously select measurement rates R1 and R2 for measuring on signals of f1 and f2 respectively, where R1>R2 as before.

This method can in particular be used for configuring the measuring node operating in connected state. In this case (i.e. in connected state) the configuration of the measurement rate as a function of the frequency can be done separately for each measuring node. This method can also be applicable for the measuring node operating in idle state. In this case however the measurement rate as a function of frequency will be applicable to multiple measuring nodes in idle state since they all are configured via broadcast channel.

According to some aspects, the determining S12 is further based on at least one of: a number of measurements to be at least partly performed in parallel or performed during at least a partly overlapping time period, a number of carrier frequencies on whose radio signals the measurements are to be performed, a bandwidth of the radio channel over which the measurement is to be performed and whether DRX is used and/or the length of DRX cycle, as further described in connection with the measuring node above.

Turning to FIG. 9, the receiver module 220, the obtainer 221, the determiner 222 and the sender 223 are implemented in hardware or in software or in a combination thereof. The modules 220, 221, 222 and 223 are according to some aspects implemented as a computer program stored in a memory 24 which run on the processing circuitry 22. The network node 20 is further configured to implement all the aspects of the disclosure as described in relation to the methods above. The network node 20 also comprises the corresponding modules. Hence, according to one aspect the disclosure relates to a computer program comprising computer program code which, when executed in a network node 20, causes network node 20 to execute the methods described above and below.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a measuring node in a communication system, for performing one or more measurements on a radio signal, the method comprising:
obtaining a carrier frequency of at least one radio signal to measure;
determining, based on a bandwidth and/or frequency range of the carrier frequency, a power-saving measurement rate that consumes less power by sampling the at least one radio signal less often relative to a faster measurement rate used for measurement on a lower carrier frequency; and
controlling power consumption of the measuring node by performing at least one measurement on the at least one radio signal with the determined power-saving measurement rate.

2. The method of claim 1, further comprising selecting the faster measurement rate for measuring on the lower carrier frequency.

3. The method of claim 1, wherein the determining comprises applying at least one rule defining which measurement rate to use based on the bandwidth and/or frequency range of the carrier frequency of the radio signal to measure.

4. The method of claim 3, wherein the at least one rule is autonomously selected by the measuring node.

5. The method of claim 3, wherein the method further comprises receiving information associated with the at least one rule from a network node.

6. The method of claim 3, wherein the at least one rule is predefined in the measuring node.

7. The method of claim 3, wherein the at least one rule maps different ranges of carrier frequencies to different measurement rates.

8. The method of claim 3, wherein the at least one rule requires selecting a higher measurement rate for measuring on a radio signal transmitted on a carrier frequency below a threshold value than for measuring on a radio signal transmitted on a carrier frequency above the threshold value.

9. The method of claim 8, wherein the threshold value is between 5 GHz and 30 GHz.

10. The method of claim 1, wherein the obtaining comprises identifying the carrier frequency of at least one signal to measure.

11. The method of claim 1, wherein the carrier frequency is at least one of:
an uplink carrier frequency on which the radio signals are uplink transmitted;
a downlink carrier frequency on which the radio signals are downlink transmitted.

12. The method of claim 1, wherein the determining is further based on at least one of:
a number of measurements to be at least partly performed in parallel or performed during at least a partly overlapping time period;
a number of carrier frequencies on whose radio signals the measurements are to be performed;
whether DRX is used and/or the length of DRX cycle.

13. The method of claim 1, further comprising transmitting, to a network node, an indication that the measuring node is configured to:
obtain a measurement rate based on the bandwidth and/or frequency range of the carrier frequency of a signal to measure; and
use the obtained measurement rate for performing measurements.

14. The method of claim 1, further comprising receiving, from a network node, a request defining a radio signal to perform measurements on.

15. A measuring node, configured to perform measurements on a radio signal, the measuring node comprising:
a radio communication interface for communication with at least one communication network;
processing circuitry configured to cause the measuring node to:
obtain a carrier frequency of at least one radio signal to measure;
determine, based on a bandwidth and/or frequency range of the carrier frequency, a power-saving measurement rate that consumes less power by sampling the at least one radio signal less often relative to a faster measurement rate used for measurement on a lower carrier frequency; and
control power consumption of the measuring node by performing, using the radio communication interface, at least one measurement on the at least one radio signal with the determined power-saving measurement rate.

16. The measuring node of claim 15, wherein the processing circuitry is further configured to select faster measurement rate for measuring on the lower carrier frequency.

17. The measuring node of claim 15, wherein the measuring node is a wireless device or a network node.

18. A non-transitory computer readable medium storing a computer program product for performing one or more measurements on a radio signal, the computer program product comprising software instructions which, when run on one or more processing circuits of a measuring node in a communication system, causes the measuring node to:
obtain a carrier frequency of at least one radio signal to measure;
determine, based on a bandwidth and/or frequency range of the obtained carrier frequency, a power-saving measurement rate that consumes less power by sampling the at least one radio signal less often relative to a faster measurement rate used for measurement on a lower carrier frequency; and
control power consumption of the measuring node by performing at least one measurement on the at least one radio signal with the determined power-saving measurement rate.

19. A method, performed in a network node in a communication system, for configuring a measuring node to perform one or more measurements on a radio signal, the method comprising:
determining, based on a bandwidth and/or frequency range of a carrier frequency, a power-saving measurement rate to be used by the measuring node for measuring on at least one radio signal, the determined power-saving measurement rate consuming less power by sampling the at least one radio signal less often relative to a faster measurement rate used for measurement on a lower carrier frequency; and
controlling power consumption of the measuring node by configuring the measuring node to measure the at least one radio signal at the determined power-saving measurement rate, the configuring comprising sending information associated with the determined power-saving measurement rate to the measuring node.

20. The method of claim 19, further comprising selecting the faster measurement rate for measuring on the lower carrier frequency.

21. The method of claim 19, further comprising:
obtaining at least one carrier frequency of at least one radio signal to be measured;
wherein the information is a determined measurement rate for respective radio signal.

22. The method of claim 19, wherein the information comprises one or more rules defining which measurement rate to use based on the bandwidth and/or frequency range of the carrier frequency of the radio signal to measure.

23. The method of claim 20, wherein the determining is further based on at least one of:
a number of measurements to be at least partly performed in parallel or performed during at least a partly overlapping time period;
a number of carrier frequencies on whose radio signals the measurements are to be performed;
whether DRX is used and/or the length of DRX cycle.

24. The method of claim 20, further comprising receiving, from the measuring node, an indication that the measuring node is configured to:

obtain a measurement rate based on the bandwidth and/or frequency range of the carrier frequency of a signal to measure; and use the obtained measurement rate for performing measurements.

25. A non-transitory computer readable medium storing a computer program product for configuring a measuring node to perform one or more measurements on a radio signal, the computer program product comprising software instructions which, when run on one or more processing circuits of a network node in a communication system, causes the network node to:

determine, based on a bandwidth and/or frequency range of a carrier frequency, a power-saving measurement rate to be used by the measuring node for measuring on at least one radio signal, the determined power-saving measurement rate consuming less power by sampling the at least one radio signal less often relative to a faster measurement rate used for measurement on a lower carrier frequency; and control power consumption of the measuring node by configuring the measuring node to measure the at least one radio signal at the determined power-saving measurement rate, the configuring comprising sending information associated with the determined power-saving measurement rate to the measuring node.

26. A network node configured to cause a measuring node to perform one or more measurements on a radio signal, the network node comprising:

a communication interface configured to communicate with measuring nodes within reach of the network node; and processing circuitry configured to cause the network node to:

determine, based on a bandwidth and/or frequency range of a carrier frequency, a power-saving measurement rate to be used by the measuring node for measuring on at least one radio signal, the determined power-saving measurement rate consuming less power by sampling the at least one radio signal less often relative to a faster measurement rate used for measurement on a lower carrier frequency; and control power consumption of the measuring node by configuring the measuring node to measure the at least one radio signal at the determined power-saving measurement rate, the configuring comprising sending information associated with the determined power-saving measurement rate to the measuring node.

* * * * *